(12) United States Patent
Jung

(10) Patent No.: US 11,171,594 B2
(45) Date of Patent: Nov. 9, 2021

(54) CONTROL APPARATUS FOR MULTIPLE-WINDING ROTATING ELECTRIC MACHINE

(71) Applicant: DENSO CORPORATION, Kariya (JP)

(72) Inventor: Sukhwa Jung, Kariya (JP)

(73) Assignee: DENSO CORPORATION, Kariya (JP)

(*) Notice: Subject to any disclaimer, the term of this patent is extended or adjusted under 35 U.S.C. 154(b) by 75 days.

(21) Appl. No.: 16/204,536

(22) Filed: Nov. 29, 2018

(65) Prior Publication Data
US 2019/0173411 A1 Jun. 6, 2019

(30) Foreign Application Priority Data

Dec. 4, 2017 (JP) ............................. JP2017-232472

(51) Int. Cl.
| | |
|---|---|
| *H02P 27/08* | (2006.01) |
| *H02P 25/22* | (2006.01) |
| *H02M 7/5387* | (2007.01) |
| *H02M 1/44* | (2007.01) |
| *H02M 1/38* | (2007.01) |

(52) U.S. Cl.
CPC ............ *H02P 27/085* (2013.01); *H02M 1/38* (2013.01); *H02M 1/44* (2013.01); *H02M 7/53871* (2013.01); *H02P 25/22* (2013.01); *H02M 7/53878* (2021.05); *H02P 2209/01* (2013.01); *H02P 2209/03* (2013.01)

(58) Field of Classification Search
CPC .... H02P 27/085; H02P 25/22; H02P 2209/01; H02M 7/53871; H02M 207/53878; H02M 1/38; H02M 1/44
See application file for complete search history.

(56) References Cited

U.S. PATENT DOCUMENTS

| | | | |
|---|---|---|---|
| 2002/0105300 A1* | 8/2002 | Moriya | ...................... H02P 6/08 318/727 |
| 2010/0253257 A1* | 10/2010 | Clothier | .............. H02P 23/0086 318/400.12 |
| 2016/0248349 A1* | 8/2016 | Kano | ....................... H02P 25/22 |
| 2017/0261246 A1* | 9/2017 | Park | ........................ H02P 21/22 |

FOREIGN PATENT DOCUMENTS

JP      2016-165174 A     9/2016

* cited by examiner

*Primary Examiner* — Kawing Chan
*Assistant Examiner* — Bradley R Brown
(74) *Attorney, Agent, or Firm* — Oliff PLC

(57) ABSTRACT

A control apparatus is provided for controlling energization of a multiple-winding rotating electric machine. The control apparatus includes inverters respectively corresponding to winding sets of the machine and a controller. The unit of a group of components provided for the energization of one winding set is defined as a system. The controller is configured to: (1) offset switching timings of switch elements of each of the inverters from those of switch elements of any other of the inverters; and (2) determine switching patterns of systems, based on an evaluation function of common-mode voltages of the systems, so as to minimize electromagnetic interference due to the common-mode voltages. In each of the systems, the common-mode voltage of the system is defined as the difference in electric potential between a neutral point in voltage of a DC power source and a neutral point of the winding set corresponding to the system.

4 Claims, 13 Drawing Sheets

FIG.5
MODULATION FACTOR = 0.1
(a) IN PHASE
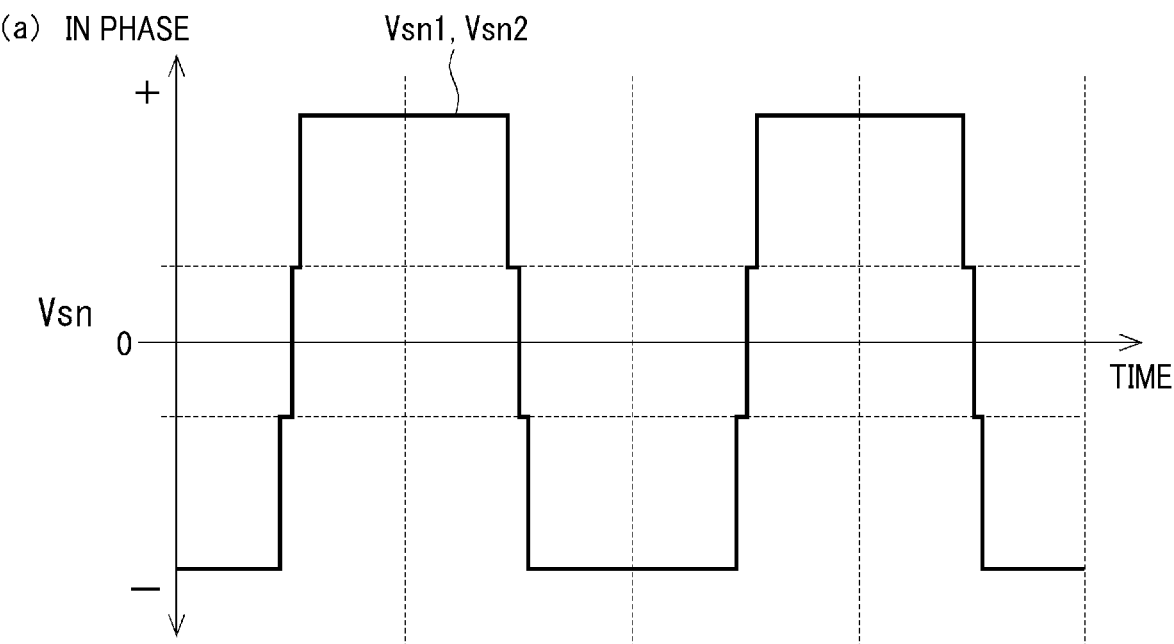
(b) IN ANTIPHASE
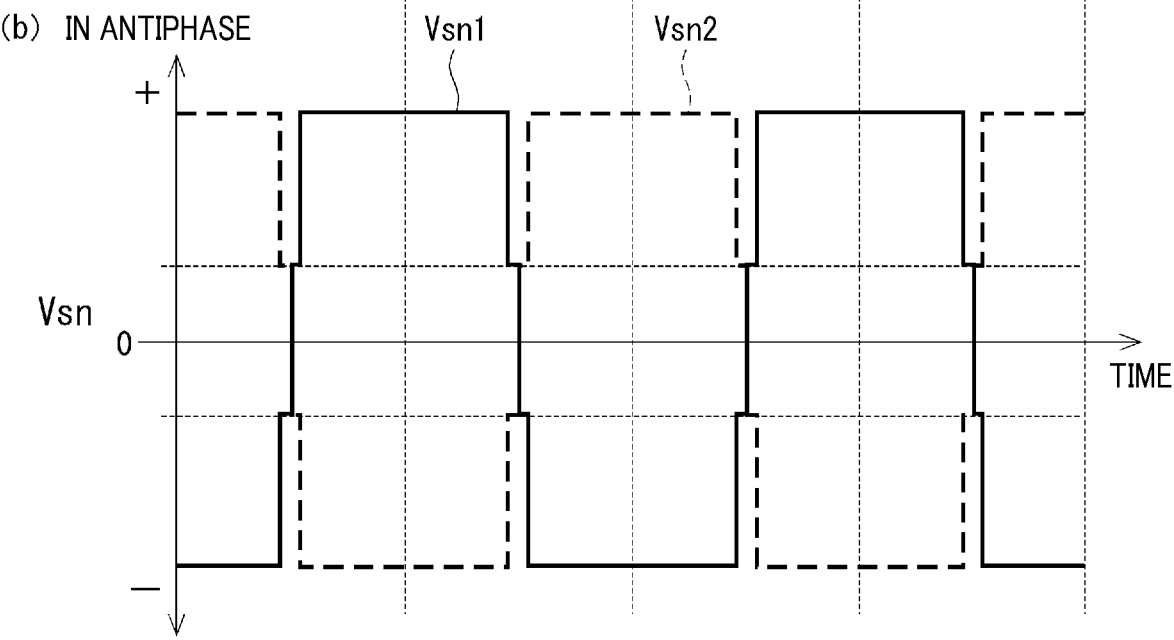

FIG.6
MODULATION FACTOR = 0.5
(a) IN PHASE
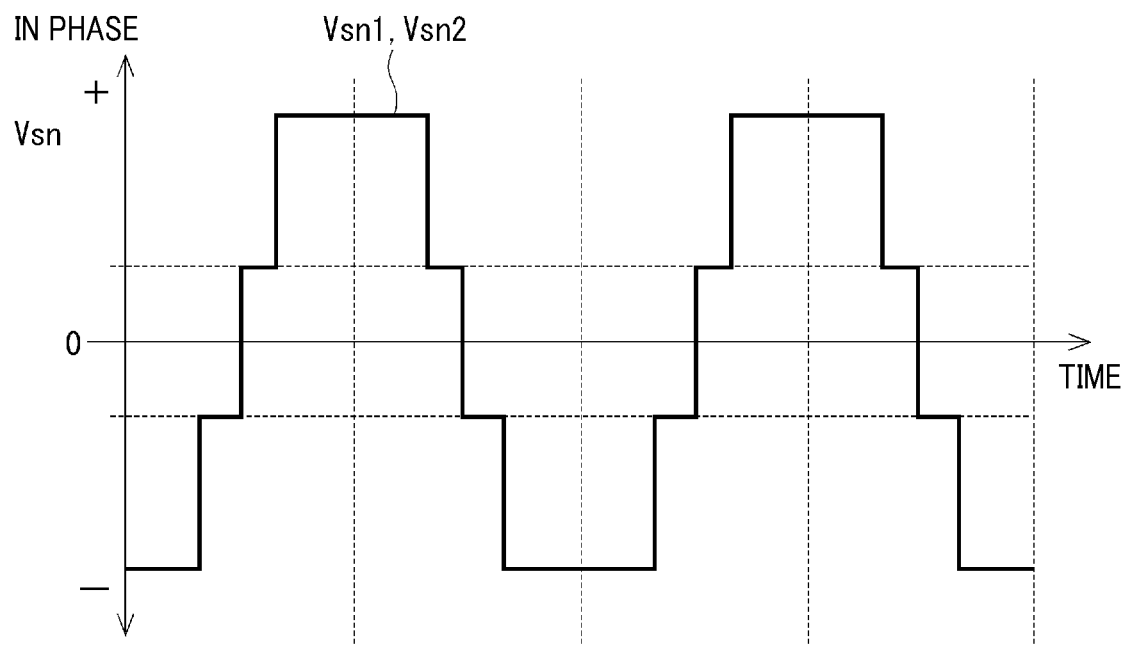
(b) IN ANTIPHASE
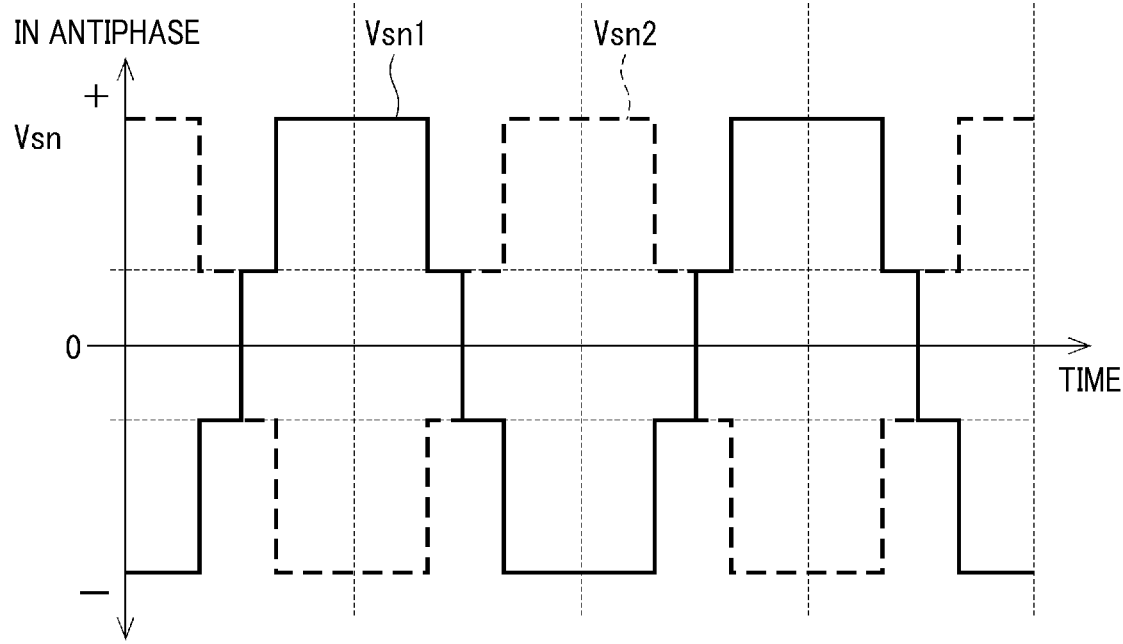

CONTROL APPARATUS FOR MULTIPLE-WINDING ROTATING ELECTRIC MACHINE

CROSS-REFERENCE TO RELATED APPLICATION

This application is based on and claims priority from Japanese Patent Application No. 2017-232472 filed on Dec. 4, 2017, the contents of which are hereby incorporated by reference in their entirety into this application.

BACKGROUND

1 Technical Field

The present disclosure relates to control apparatuses for multiple-winding rotating electric machine.

2 Description of Related Art

There are known control apparatuses that include a plurality of inverters and control energization of multi-phase rotating electric machines having a plurality of winding sets.

For example, Japanese Patent Application Publication No. JP2016165174A discloses a control apparatus for a multiple-winding motor. The control apparatus is designed to suppress decrease in EMC (Electromagnetic Compatibility) caused by superimposition of switching noise when switch elements of inverters of two systems are simultaneously turned on or off. To this end, the control apparatus drives the motor by controlling the switching of corresponding switch elements of first and second systems with signals of different phases.

In general, when switch elements are turned on or off, a common-mode voltage is generated which is the difference in electric potential between the neutral point in voltage of a DC power source and the neutral point of each winding set. Moreover, the common-mode voltage induces leakage current that is a cause of conductive and radiated EMI (Electro-Magnetic Interference). Therefore, in investigating reduction of EMI, it is necessary to comprehensively evaluate the absolute value and the variation of the common-mode voltage. However, the above patent document has focused only on the reduction of switching noise by offsetting the on/off timings of the corresponding switch elements of the two systems.

In addition, in the above patent document, it is described that the invention can be applied not only to a two-system control apparatus but also to control apparatuses of three or more systems. However, the above patent document fails to specifically disclose how to offset the on/off timings of corresponding switch elements of three or more systems.

SUMMARY

According to a first aspect of the present disclosure, there is provided a control apparatus for a multiple-winding rotating electric machine that includes a plurality of winding sets. The control apparatus includes a plurality of inverters respectively corresponding to the winding sets of the multiple-winding rotating electric machine and a controller. Each of the inverters includes a plurality of switch elements and is configured to convert, through switching operation of the switch elements, DC power outputted from a DC power source into multi-phase AC power and supply the resultant multi-phase AC power to the corresponding winding set.

The controller is configured to calculate target output voltages of the inverters and determine switching patterns of a plurality of systems according to the calculated target output voltages. Each of the systems is constituted of a group of components provided for energization of a corresponding one of the winding sets of the multiple-winding rotating electric machine; the group of components includes the one of the inverters which supplies the multi-phase AC power to the corresponding winding set. Moreover, the controller is configured to: (1) offset switching timings of the switch elements of each of the inverters from switching timings of the switch elements of any other of the inverters; and (2) determine the switching patterns of the systems, based on an evaluation function of common-mode voltages of the systems, so as to minimize electro-magnetic interference due to the common-mode voltages. In each of the systems, the common-mode voltage of the system is defined as the difference in electric potential between a neutral point in voltage of the DC power source and a neutral point of the winding set corresponding to the system.

Specifically, the controller may calculate, based on the evaluation function, a total common-mode voltage as a sum of the common-mode voltages of the systems. Moreover, the controller may determine the switching patterns of the systems so as to minimize the maximum value of the absolute value of the total common-mode voltage. In this case, it is possible to minimize the time-average value of a total leakage current induced by the common-mode voltages of the systems.

Alternatively or simultaneously, the controller may determine the switching patterns of the systems so as to minimize the rate of change of the total common-mode voltage. In this case, it is possible to minimize the maximum amplitude of the total leakage current induced by the common-mode voltages of the systems.

Moreover, the controller may search the switching patterns of the systems in an off-line mode. In this case, it is possible to reduce the computing load of the controller.

According to a second aspect of the present disclosure, there is provided a control apparatus for a multiple-winding rotating electric machine that includes N winding sets, where N is an integer greater than or equal to 2. The control apparatus includes N inverters respectively corresponding to the N winding sets of the multiple-winding rotating electric machine and a controller. Each of the inverters includes a plurality of switch elements and is configured to convert, through switching operation of the switch elements, DC power outputted from a DC power source into multi-phase AC power and supply the resultant multi-phase AC power to the corresponding winding set. The controller is configured to calculate target output voltages of the inverters and determine switching patterns of N systems according to the calculated target output voltages. Each of the N systems is constituted of a group of components provided for energization of a corresponding one of the N winding sets of the multiple-winding rotating electric machine; the group of components includes the one of the N inverters which supplies the multi-phase AC power to the corresponding winding set. Moreover, for each of intervals between switching timings of the switch elements of the inverters, the total number of those of the switch elements of the inverters which are in an ON state during the interval is defined as "the number of ON switches".

When N is an even number, the controller determines the switching patterns of the systems so as to keep the number of ON switches constant at an optimal number Pe calculated by the following Equation (f1):

$$Pe = 3 \times (N/2) \tag{f1}$$

On the other hand, when N is an odd number, the controller determines the switching patterns of the systems so as to keep the number of ON switches constant at one of an optimal numbers Po1 calculated by the following Equation (f2.1) and an optimal number Po2 calculated by the following Equation (f2.2) or have the number of ON switches equal to the optimal number Po1 during some of the intervals between the switching timings and to the optimal number Po2 during the other of the intervals:

$$Po1 = 3 \times [(N-1)/2] + 1 \tag{f2.1}$$

$$Po2 = 3 \times [(N+1)/2] - 1 \tag{f2.2}$$

According to a third aspect of the present disclosure, there is provided a control apparatus for a multiple-winding rotating electric machine that includes N winding sets, where N is an integer greater than or equal to 3. The control apparatus includes N inverters respectively corresponding to the N winding sets of the multiple-winding rotating electric machine and an inverter. Each of the inverters includes a plurality of switch elements and is configured to convert, through switching operation of the switch elements, DC power outputted from a DC power source into multi-phase AC power and supply the resultant multi-phase AC power to the corresponding winding set. The controller is configured to calculate target output voltages of the inverters and determine switching patterns of N systems according to the calculated target output voltages. Each of the N systems is constituted of a group of components provided for energization of a corresponding one of the N winding sets of the multiple-winding rotating electric machine; the group of components includes the one of the N inverters which supplies the multi-phase AC power to the corresponding winding set. Moreover, the controller is configured to: (1) produce the switching patterns of the systems by a PWM (Pulse Width Modulation) control that is performed by comparing, for each of the systems, duty signals of the system which correspond to the target output voltage of the inverter of the system, with a carrier signal of the system; and (2) set a phase difference $\Delta\theta$ between the carrier signals of the systems in the PWM control according to the following Equation: $\Delta\theta = 360° \times k/N$, where k is an integer greater than or equal to 1 and less than or equal to (N−1).

BRIEF DESCRIPTION OF THE DRAWINGS

In the accompanying drawings:

FIG. 5 is a schematic diagram including both a time chart (a) of the common-mode voltages of the first and second systems when carrier signals of the first and second systems are in phase and a time chart (b) of the common-mode voltages of the first and second systems when the carrier signals of the first and second systems are in antiphase in the double-system control apparatus according to the first embodiment, wherein the modulation factor is equal to 0.1;

FIG. 6 is a schematic diagram including both a time chart (a) of the common-mode voltages of the first and second systems when the carrier signals of the first and second systems are in phase and a time chart (b) of the common-mode voltages of the first and second systems when the carrier signals of the first and second systems are in antiphase in the double-system control apparatus according to the first embodiment, wherein the modulation factor is equal to 0.5;

DESCRIPTION OF EMBODIMENTS

Figure 1:
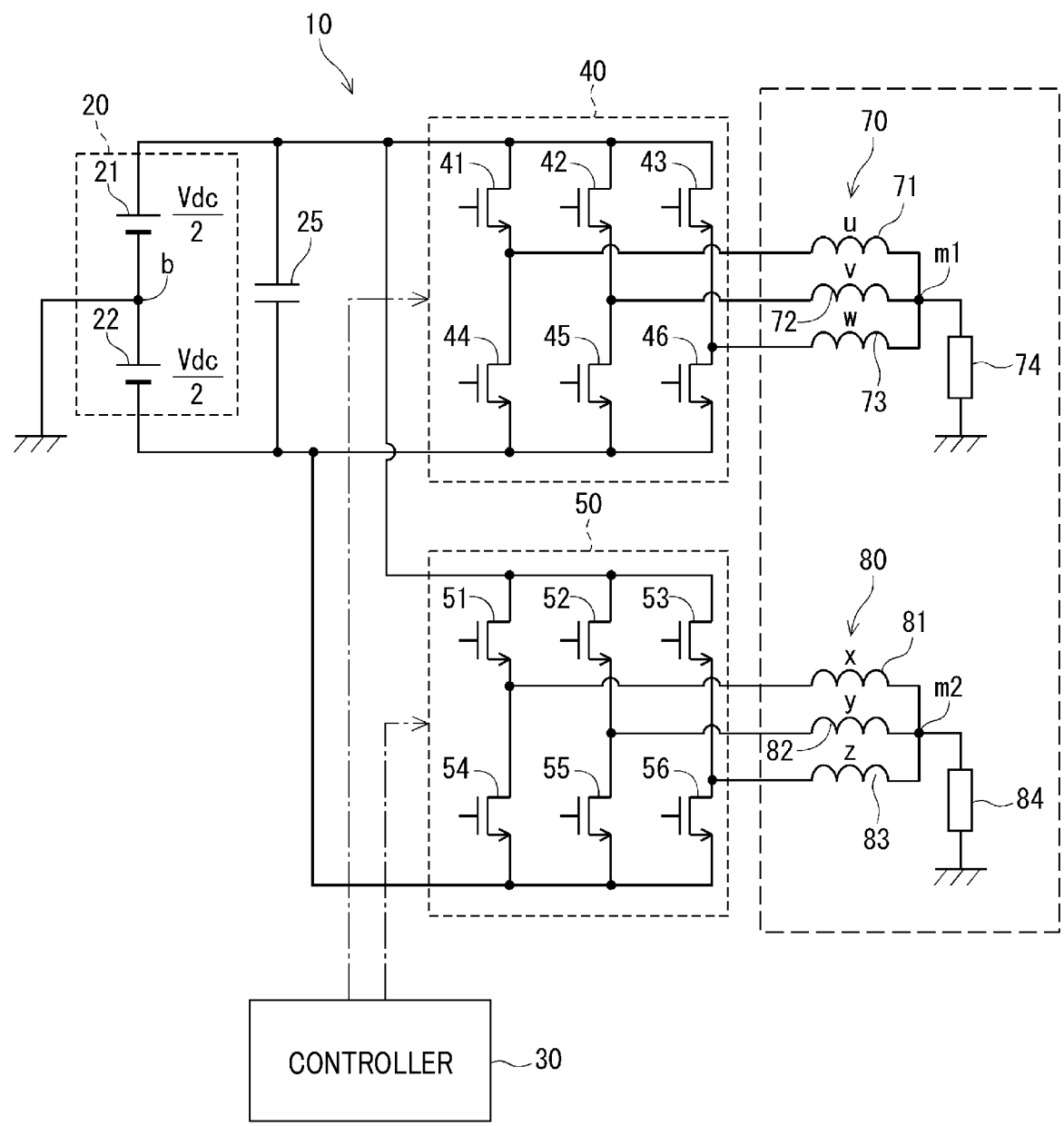
FIG. 1 is a schematic diagram illustrating the configuration of a double-system control apparatus according to a first embodiment.

Exemplary embodiments will be described hereinafter with reference to FIGS. 1-13. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

Control apparatuses according to the exemplary embodiments are designed to control multiple-winding rotating electric machines each of which is configured as, for example, an ISG (Integrated Starter Generator) that has both the function of an automotive engine starter and the function of an automotive alternator.

The multiple-winding rotating electric machines each include a plurality of multi-phase winding sets having the same electrical specifications. Upon energization of (or supply of electric power to) the plurality of winding sets, torque is generated at a common rotating shaft.

In all of the exemplary embodiments, the number of phases of each winding set is equal to 3. On the other hand, the number of the winding sets varies between the exemplary embodiments. Specifically, the number of the winding sets is equal to 2 in the first embodiment, 3 in the second embodiment and 4 in the third embodiment.

For the sake of simplicity, hereinafter, the multi-phase rotating electric machines will be simply referred to as the "motors" and the control apparatuses that control the multi-phase rotating electric machines will be simply referred to as the "motor control apparatuses".

Each of the motor control apparatuses includes a plurality of inverters that respectively correspond to the plurality of winding sets of the motor controlled by the motor control apparatus. Each of the inverters includes a plurality of switch elements. Moreover, each of the inverters is configured to convert, through the switching operation of the plurality of switch elements, DC power outputted from a DC power source into three-phase AC power and supply the resultant three-phase AC power to the corresponding winding set.

For the sake of convenience of explanation, hereinafter, the unit of a group of components relating to the energization of one winding set is defined as a "system". Moreover, the motor control apparatus that controls the energization of the motor having N winding sets will be referred to as the "N-tuple-system motor control apparatus", where N is an integer greater than or equal to 2. Specifically, the motor control apparatus according to the first embodiment will be referred to as the "double-system motor control apparatus"; the motor control apparatus according to the second embodiment will be referred to as the "triple-system motor control apparatus"; and the motor control apparatus according to the third embodiment will be referred to as the "quadruple-system motor control apparatus".

First Embodiment

The double-system motor control apparatus 10 according to the first embodiment will be described hereinafter with reference to FIGS. 1-7.

As shown in FIG. 1, the double-system motor control apparatus 10 includes an inverter 40 of a first system, an inverter 50 of a second system and a controller 30.

For the sake of simplicity, hereinafter, the inverter 40 of the first system will be simply referred to as the "first inverter 40" and the inverter 50 of the second system will be simply referred to as the "second inverter 50".

The first and second inverters 40 and 50 are connected, in parallel with each other, to a battery 20 that is a DC power source. On the input side of the first and second inverters 40 and 50, there is provided a smoothing capacitor 25.

In FIG. 1, the imaginary neutral point of the battery 20, which divides the DC voltage Vdc of the battery 20 into two halves, is designated by "b". The battery 20 can be regarded as being composed of two batteries 21 and 22 whose voltages are both equal to (Vdc/2) and which are connected in series with each other at the neutral point b. In addition, the electric potential at the neutral point b is defined as a zero potential.

The motor 700, which is controlled by the motor control apparatus 10, includes a first three-phase winding set 70 and a second three-phase winding set 80. The first winding set 70 is comprised of a u-phase winding 71, a v-phase winding 72 and a w-phase winding 73. The second winding set 80 is comprised of an x-phase winding 81, a y-phase winding 82 and a z-phase winding 83. That is, the motor 700 is a dual (or double) three-phase winding motor.

The u-phase, v-phase and w-phase windings 71, 72 and 73 of the first winding set 70 are Y-connected to define a neutral point m1 therebetween. A parasitic component 74 is considered to exist between the neutral point m1 of the first winding set 70 and a zero-potential point in, for example, a frame of the motor 700.

Similarly, the x-phase, y-phase and w-phase windings 81, 82 and 83 of the second winding set 80 are Y-connected to define a neutral point m2 therebetween. A parasitic component 84 is considered to exist between the neutral point m2 of the second winding set 80 and the zero-potential point.

The first inverter 40 has u-phase, v-phase and w-phase upper-arm switch elements 41, 42 and 43 and u-phase, v-phase and w-phase lower-arm switch elements 44, 45 and 46 bridge-connected. The first inverter 40 converts, through the switching operation of the switch elements 41-46, DC power outputted from the battery 20 into three-phase AC power and supplies the resultant three-phase AC power to the first winding set 70.

Similarly, the second inverter 50 has the x-phase, y-phase and z-phase upper-arm switch elements 51, 52 and 53 and the x-phase, y-phase and z-phase lower-arm switch elements 54, 55 and 56 bridge-connected. The second inverter 50 converts, through the switching operation of the switch elements 51-56, DC power outputted from the battery 20 into three-phase AC power and supplies the resultant three-phase AC power to the second winding set 80.

The controller 30 is configured with, for example, a microcomputer. The controller 30 includes a CPU (Central Processing Unit), a ROM (Read Only Memory), a RAM (Random Access Memory), I/O (Input/Output) interfaces and bus lines connecting the aforementioned components. The controller 30 performs various controls by performing software processes and/or hardware processes. The software processes are performed by the execution of programs, which are stored in the ROM in advance, by the CPU. In contrast, the hardware processes are performed by dedicated electronic circuits provided in the controller 30. In addition, ordinary motor controls performed by the controller 30, such as a current feedback control and a vector control, are neither shown nor described in the present disclosure.

Hereinafter, the patterns of on/off operation of the switch elements 41-46 of the first inverter 40 and the switch elements 51-56 of the second inverter 50 will be referred to as "switching patterns".

The controller 30 calculates target output voltages of the first and second inverters 40 and 50 on the basis of a command value of the torque of the motor 700. Then, the controller 30 determines switching patterns of the first and second inverters 40 and 50 (i.e., switching patterns of the first and second systems) according to the calculated target output voltages of the first and second inverters 40 and 50.

More particularly, in the present embodiment, the controller 30 produces the switching patterns by a PWM (Pulse Width Modulation) control that is performed by comparing duty signals with corresponding carrier signals. As an alternative, the controller 30 may produce the switching patterns using pulse patterns in which the switching phase and on-duration for one period of electrical angle are arbitrarily set.

As disclosed in Japanese Patent Application Publication No. JP2016165174A, when corresponding switch elements of two systems are simultaneously turned on or off, different components of switching noise are superimposed on each other, causing EMI (Electro-Magnetic Interference) to occur.

To suppress EMI, in the present embodiment, the controller 30 offsets the switching timings (or on/off timings) of the switch elements 41-46 of the first inverter 40 from the switching timings of the switch elements 51-56 of the second inverter 50 in the same manner as disclosed in the above patent document.

However, the above patent document has focused only on the reduction of switching noise by offsetting the switching timings of the corresponding switch elements of the two systems.

In contrast, the present disclosure has focused also on common-mode voltages of the two systems which induce leakage current that is a cause of EMI.

Specifically, in the present embodiment, the common-mode voltage of the first system is defined as the difference in electric potential between the neutral point b of the battery 20 and the neutral point m1 of the first winding set 70. Similarly, the common-mode voltage of the second system is defined as the difference in electric potential between the neutral point b of the battery 20 and the neutral point m2 of the second winding set 80.

For facilitating understanding of the switching pattern determination by the controller 30, the common-mode voltage in a single-system motor control apparatus 19 will be first described hereinafter with reference to FIGS. 11-13.

Figure 11:
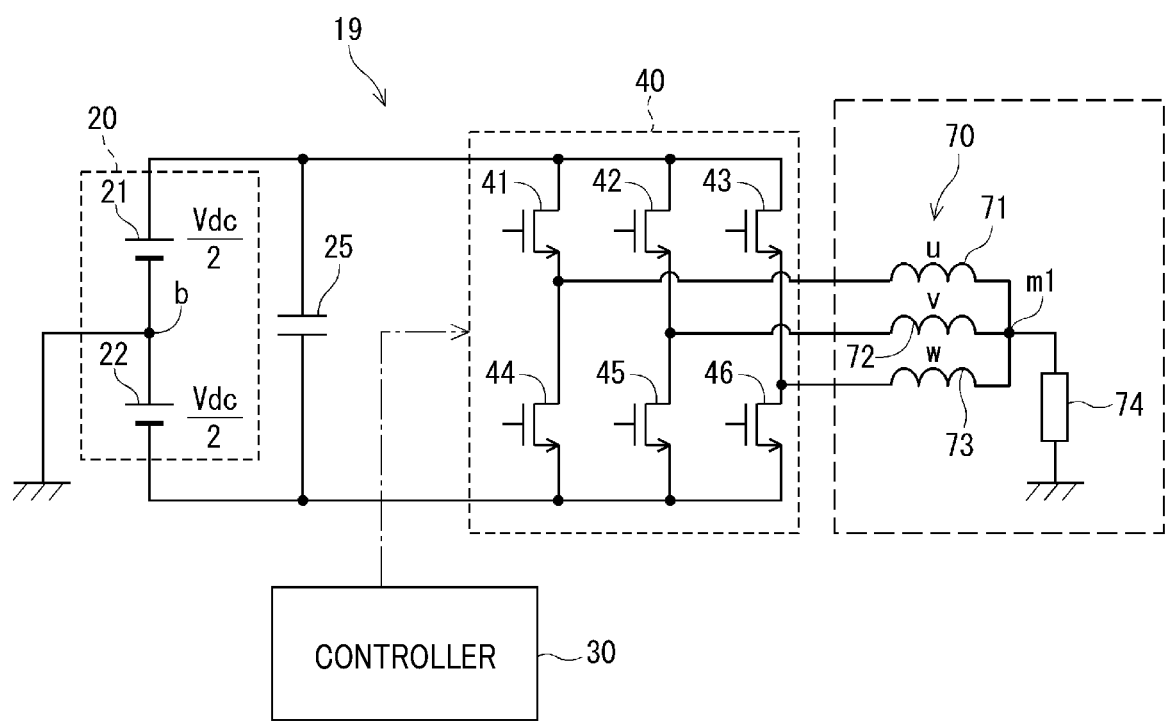
FIG. 11 is a schematic diagram illustrating the configuration of a single-system control apparatus.

As shown in FIG. 11, compared to the double-system motor control apparatus 10 according to the present embodiment, the single-system motor control apparatus 19 includes the battery 20, the smoothing capacitor 25, the controller 30 and the first inverter 40, but no second inverter 50. Moreover, compared to the motor 700 according to the present embodiment, a motor 700 that is controlled by the single-system motor control apparatus 19 includes only the single winding set 70.

Figure 12:
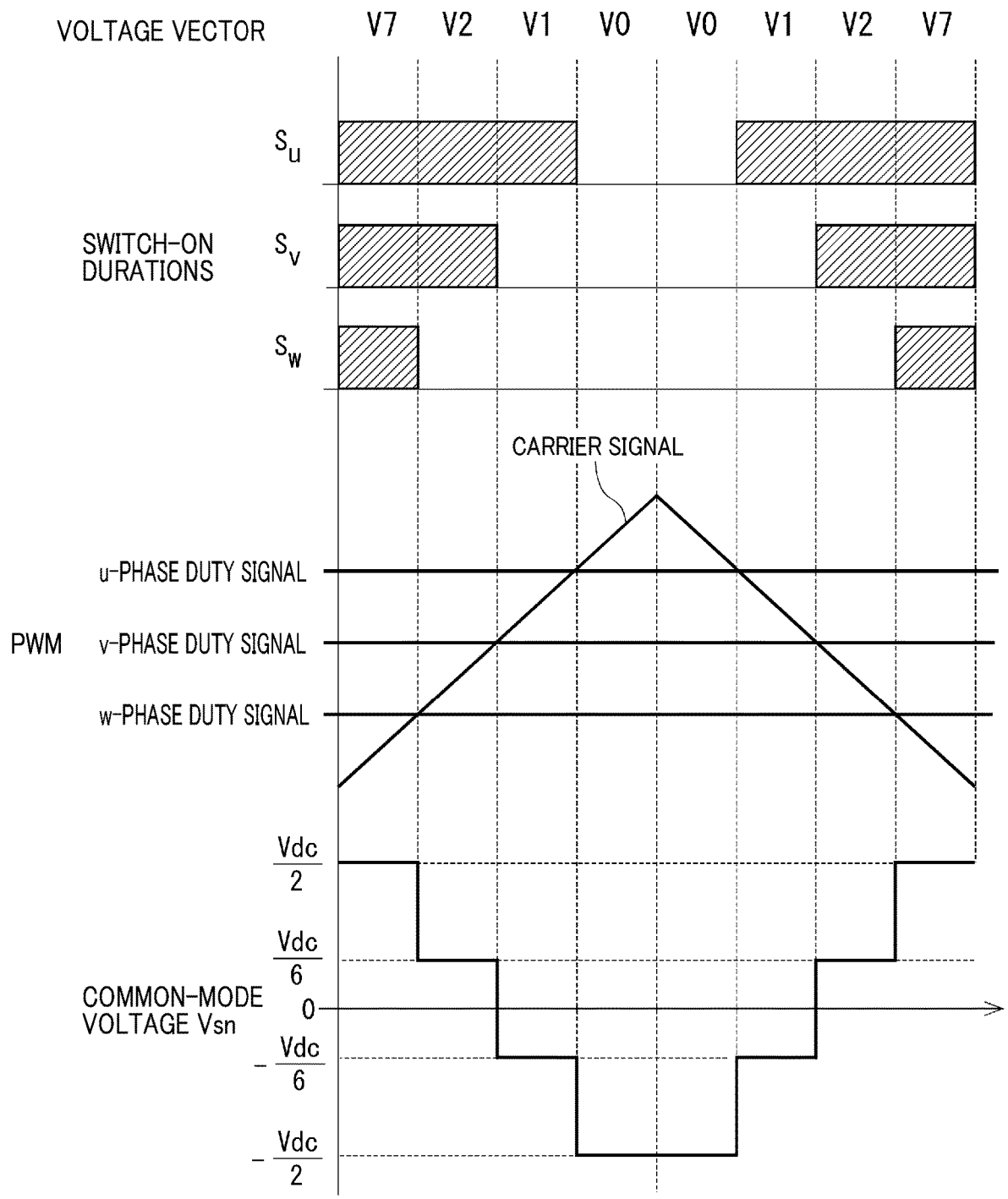
FIG. 12 is a schematic diagram illustrating a switching pattern of the single-system control apparatus.
Figure 13:
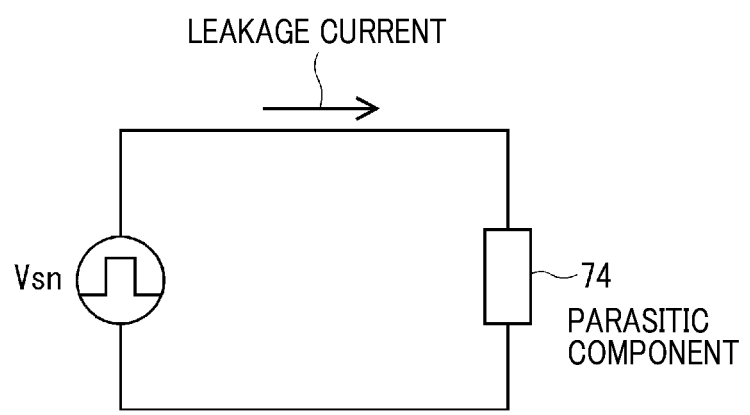
FIG. 13 is a schematic diagram illustrating an equivalent circuit of a leakage current circuit formed in the single-system control apparatus.

FIG. 12 shows the relationship between the voltage vector state, the switch-on durations that are set by the PWM control through the comparison of u-phase, v-phase and w-phase duty signals with a carrier signal and the common-mode voltage Vsn.

It should be noted that in FIG. 12 and FIGS. 2 and 8-10 that will be described later, for each phase, those switch-on durations of the phase during which the upper-arm switch of the phase is in an ON state whereas the lower-arm switch of the phase is in an OFF state are hatched. Moreover, for each phase, the switch function S of the phase takes the value of 1 when the upper-arm switch element of the phase is in the ON state and the lower-arm switch element of the phase is in the OFF state and takes the value of 0 when the upper-arm switch element of the phase is in the OFF state and the lower-arm switch element of the phase is in the ON state.

In the single-system motor control apparatus 19, the common-mode voltage Vsn of the single system can be calculated by the following Equation (1):

$$V_{sn} = \frac{V_{un} + V_{vn} + V_{wn}}{3} \qquad (1)$$
$$= \frac{Vdc}{6}(2S_u + 2S_v + 2S_w - 3) = \frac{Vdc}{3}(S_u + S_v + S_w) - \frac{1}{2}Vdc$$

where Vun, Vvn and Vwn are respectively the u-phase, v-phase and w-phase common-mode voltages, Vdc is the DC voltage of the battery 20 and Su, Sv and Sw are respectively the u-phase, v-phase and w-phase switch functions.

Moreover, for each of the intervals between the switching timings of the switch elements, the total number of those upper-arm switch elements which are in the ON state during the interval is defined as "the number of ON switches". In addition, in above Equation (1), the number of ON switches is represented by (Su+Sv+Sw).

In the single-system motor control apparatus 19, during one period of the carrier signal, the number of ON switches takes four values of 3, 2, 1 and 0. Moreover, during each of the intervals between the switching timings of the switch elements, the common-mode voltage Vsn takes one of the four values (Vdc/2), (Vdc/6), −(Vdc/6) and −(Vdc/2).

That is, in the single-system motor control apparatus 19, the common-mode voltage Vsn being not equal to 0 is constantly generated. Consequently, as shown in FIG. 13, leakage current is induced by the common-mode voltage Vsn to flow through the parasitic component 74.

As described above, in the single-system motor control apparatus 19, it is impossible to eliminate the leakage current induced by the common-mode voltage Vsn.

In contrast, in the double-system motor control apparatus 10 according to the present embodiment, the common-mode voltage Vsn1 of the first system and the common-mode voltage Vsn2 of the second system can be respectively calculated by the following Equations (2.1) and (2.2):

$$V_{sn1} = \frac{Vdc}{6}(2S_u + 2S_v + 2S_w - 3) \qquad (2.1)$$

$$V_{sn2} = \frac{Vdc}{6}(2S_x + 2S_y + 2S_z - 3) \qquad (2.2)$$

where Vdc is the DC voltage of the battery 20 and Su, Sv, Sw, Sx, Sy and Sz are respectively the u-phase, v-phase, w-phase, x-phase, y-phase and z-phase switch functions.

As described previously, the first and second inverters 40 and 50 are connected in parallel to each other. The total common-mode voltage Vsn of the double-system motor control apparatus 10 can be calculated by the following Equation (3):

$$V_{sn} = V_{sn1} + V_{sn2} = \frac{Vdc}{3}(S_u + S_v + S_w + S_x + S_y + S_z) - Vdc \qquad (3)$$

The number of ON switches (Su+Sv+Sw+Sx+Sy+Sz) in above Equation (3) can take any of the seven values 0, 1, 2, 3, 4, 5, 6 and 7 depending on the combination of switching patterns of the first and second systems. Moreover, the total common-mode voltage Vsn varies depending on the number of ON switches. Therefore, above Equation (3) can be regarded as an evaluation function of the common-mode voltages Vsn1 and Vsn2 of the first and second systems for minimizing EMI caused by the leakage currents induced by the common-mode voltages Vsn1 and Vsn2.

Specifically, when the number of ON switches (Su+Sv+Sw+Sx+Sy+Sz) in above Equation (3) is equal to 3, the common-mode voltage Vsn1 of the first system and the common-mode voltage Vsn2 of the second system are canceled by each other so that the total common-mode voltage Vsn becomes zero (i.e., minimized). Therefore, when the switching patterns of the first and second systems are determined so as to have the number of ON switches (Su+Sv+Sw+Sx+Sy+Sz) always equal to 3, the value of the evaluation function is optimized.

Figure 2:
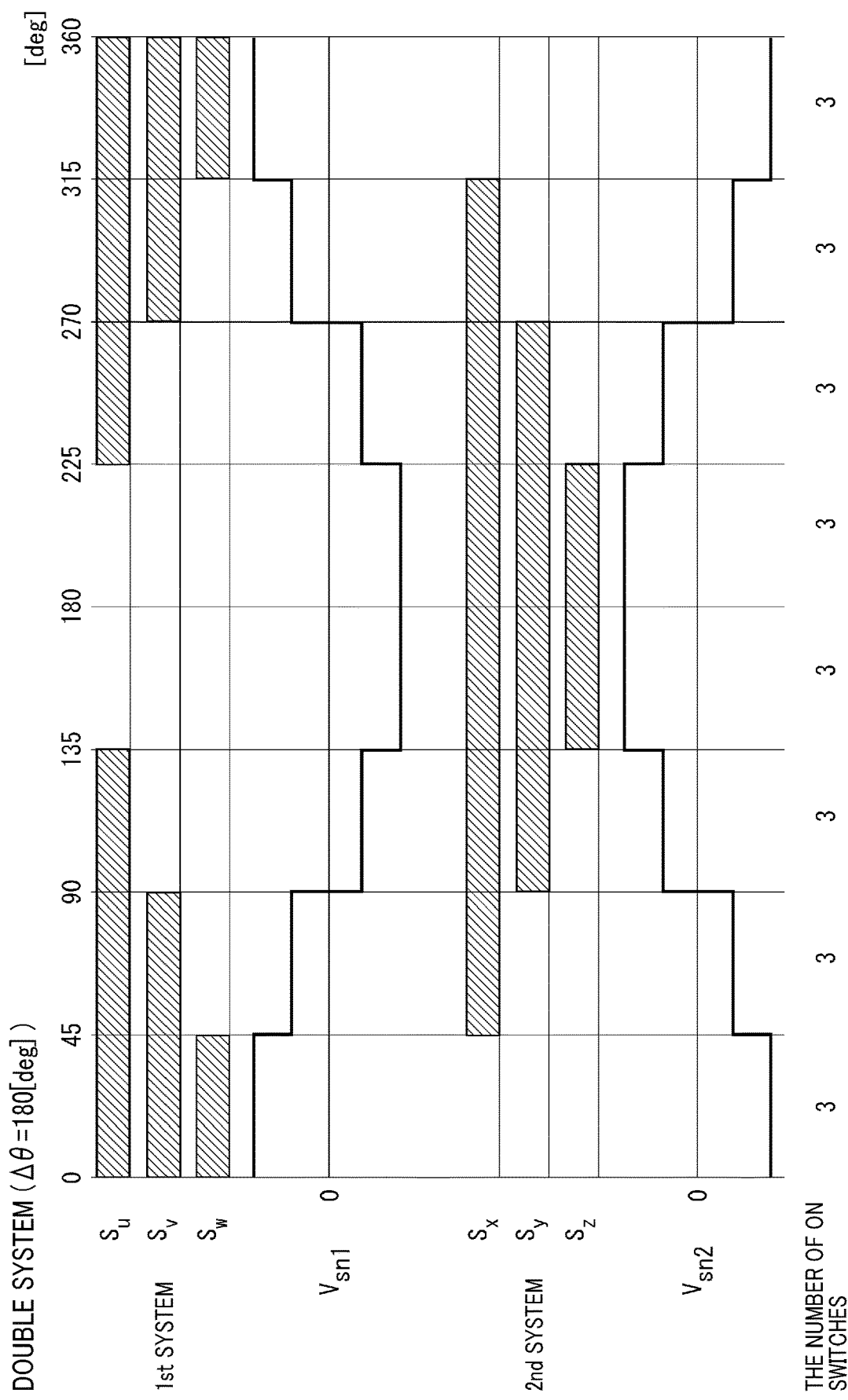
FIG. 2 is a schematic diagram illustrating an example of switching patterns of the first and second systems in the double-system control apparatus according to the first embodiment.

FIG. 2 shows switching patterns of the first and second systems with which the number of ON switches (Su+Sv+Sw+Sx+Sy+Sz) is kept constant at 3. These switching patterns are obtained by offsetting the phases of the carrier signals of the first and second systems in the PWM control from each other by 180°, in other words, by setting the carrier signals of the first and second systems to be in antiphase.

Specifically, in the switching patterns shown in FIG. 2, at intervals of 45°, one switch element of any one of the three phases in each of the first and second systems is turned on or off. Moreover, at the time when one switch element of one of the first and second systems is turned on, one switch element of the other of the first and second systems is simultaneously turned off. Consequently, the number of ON switches (Su+Sv+Sw+Sx+Sy+Sz) is always kept constant. In addition, switching noise caused by the overlap of the ON timing of one switch element and the OFF timing of another switch element is not given weight in determining the switching patterns.

Figure 3:
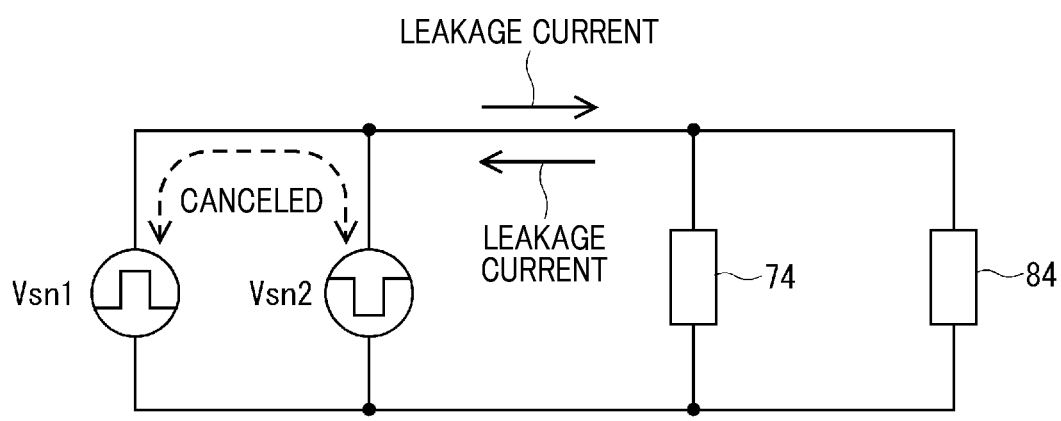
FIG. 3 is a schematic diagram illustrating an equivalent circuit of a leakage current circuit formed in the double-system control apparatus according to the first embodiment.

As shown in FIG. 3, in the double-system motor control apparatus 10, with the switching patterns of the first and second systems in antiphase to each other, the common-mode voltage Vsn1 of the first system and the common-mode voltage Vsn2 of the second system are canceled by each other so that the total common-mode voltage Vsn becomes zero. Consequently, leakage current induced by the common-mode voltage Vsn1 to flow through the parasitic component 74 in the first system and leakage current induced by the common-mode voltage Vsn2 to flow through the parasitic component 84 in the second system are canceled by each other.

That is, in the present embodiment, the controller 30 determines, using the evaluation function, the switching patterns of the first and second systems so as to satisfy two requirements, i.e., (a) minimize the maximum value of the absolute value of the total common-mode voltage Vsn and (b) minimize the rate of change of the total common-mode voltage Vsn. Moreover, by satisfying the above requirement (a), it is possible to minimize the time-average value of the total leakage current induced by the common-mode voltages Vsn1 and Vsn2 of the first and second systems. On the other hand, by satisfying the above requirement (b), it is possible to minimize the maximum amplitude of the total leakage current induced by the common-mode voltages Vsn1 and Vsn2 of the first and second systems.

In addition, the controller 30 may determine the switching patterns of the first and second systems so as to satisfy either of the above requirements (a) and (b). However, in terms of reliably suppressing EMI, it is preferable for the controller 30 to determine the switching patterns so as to satisfy both of the above requirements (a) and (b). The reason will be explained below with reference to FIGS. 4A and 4B.

Figure 4A:
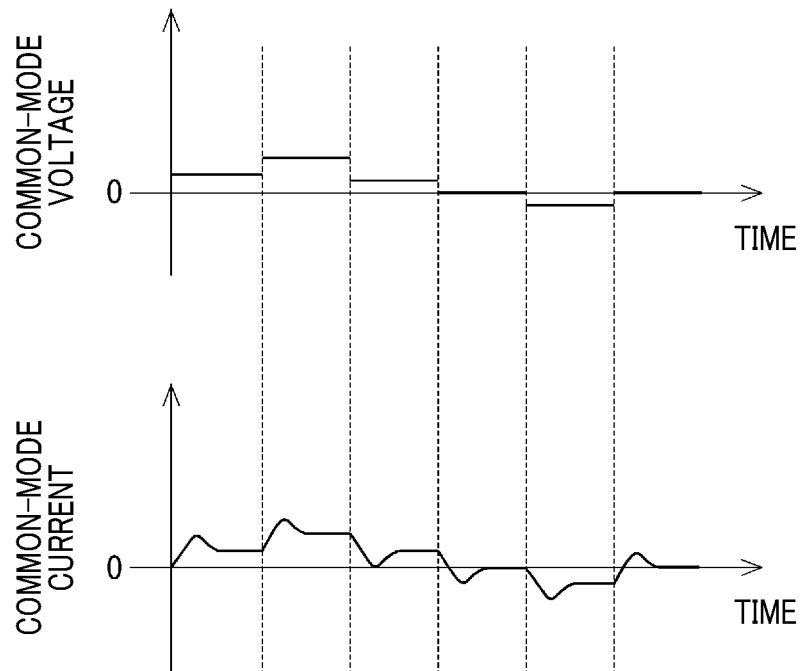
FIG. 4A is a schematic diagram illustrating a first example of common-mode voltage and common-mode current.

FIG. 4A shows a first example of common-mode voltage and common-mode current. In this example, the common-mode voltage frequently changes within a range close to 0. When the common-mode voltage is increased, there occurs a positive-side peak in the common-mode current due to overshoot. In contrast, when the common-mode voltage is lowered, there occurs a negative-side peak in the common-mode current due to undershoot. That is, though the absolute value of the common-mode voltage is constantly low, the common-mode current takes large instantaneous values due to the change with time of the common-mode voltage. Therefore, this example is not preferable.

Figure 4B:
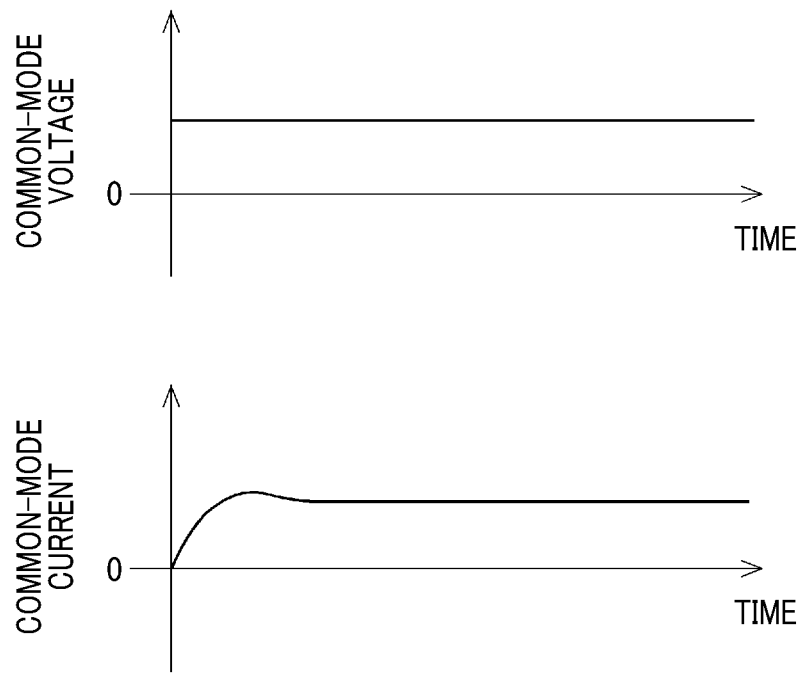
FIG. 4B is a schematic diagram illustrating a second example of common-mode voltage and common-mode current.

FIG. 4B shows a second example of common-mode voltage and common-mode current. In this example, the common-mode voltage is kept constant at a relatively large value. That is, though the change with time of the common-mode voltage is small (more particularly, zero), the absolute value of the common-mode voltage is relatively large. Consequently, the absolute value of the common-mode current is also relatively large. Therefore, this example is also not preferable.

In view of the above, in the present embodiment, the controller 30 searches switching patterns of the first and second systems which maximally satisfy both of the above requirements (a) and (b). More particularly, with the switching patterns shown in FIG. 2, the maximum value of the absolute value of the total common-mode voltage Vsn is always equal to 0 (i.e., minimized); the rate of change of the total common-mode voltage Vsn is also always equal to 0 (i.e., minimized). Therefore, by controlling the on/off operation of the switch elements 41-46 and 51-56 of the first and second inverters 40 and 50 with the switching patterns shown in FIG. 2, it is possible to minimize EMI due to the common-mode voltages Vsn1 and Vsn2 of the first and second systems.

Next, referring again to FIG. 2, the significance of setting the number of ON switches in the double-system motor control apparatus 10 to be always equal to 3 will be described below.

The number of systems of a multiple-system motor control apparatus 10 can be generally represented by N, where N is an integer greater than or equal to 2. In the case of the double-system motor control apparatus 10 according to the present embodiment, N is equal to 2.

Moreover, when N is an even number, the optimal number Pe of ON switches in the N-tuple-system motor control apparatus 10 can be calculated by the following Equation (4):

$$Pe=3\times(N/2) \qquad (4)$$

Here, the optimal number Pe of ON switches denotes the number of ON switches at which the maximum value of the absolute value of the total common-mode voltage Vsn in the N-tuple-system motor control apparatus 10 is minimum.

Accordingly, in the case of the double-system motor control apparatus 10 according to the present embodiment, substituting N=2 into above Equation (4), it is obtained that Pe=3. In addition, the optimal number Pe also represents the optimal value of the term (Su+Sv+Sw+Sx+Sy+Sz) in Equation (3). When this term is equal to the optimal number Pe (i.e., 3), the value of Equation (3) is equal to 0. That is, the absolute value of the value of Equation (3) is minimized.

Next, the significance of setting the phase difference Δθ between the carrier signals of the first and second systems in the PWM control to 180° will be described.

FIG. 5(a) is a time chart of the common-mode voltages Vsn1 and Vsn2 of the first and second systems when the modulation factor is equal to 0.1 and the carrier signals of the first and second systems are in phase. In contrast, FIG. 5(b) is a time chart of the common-mode voltages Vsn1 and Vsn2 of the first and second systems when the modulation factor is equal to 0.1 and the carrier signals of the first and second systems are in antiphase.

FIG. 6(a) is a time chart of the common-mode voltages Vsn1 and Vsn2 of the first and second systems when the modulation factor is equal to 0.5 and the carrier signals of the first and second systems are in phase. In contrast, FIG. 6(b) is a time chart of the common-mode voltages Vsn1 and Vsn2 of the first and second systems when the modulation factor is equal to 0.5 and the carrier signals of the first and second systems are in antiphase.

As seen from FIG. 5(a) and FIG. 6(a), when the carrier signals of the first and second systems are in phase, the common-mode voltages Vsn1 and Vsn2 of the first and second systems are superimposed on each other. Consequently, the total common-mode voltage Vsn (i.e., Vsn1+Vsn2) of the double-system motor control apparatus 10 becomes twice the common-mode voltage Vsn of the single-system motor control apparatus 19 (see FIGS. 11-13). As a result, the time-average value of the total leakage current in the double-system motor control apparatus 10 is increased.

In contrast, as seen from FIG. 5($b$) and FIG. 6($b$), when the carrier signals of the first and second systems are in antiphase (i.e., the phase difference $\Delta\theta$ between the carrier signals is equal to 180°), the common-mode voltages Vsn1 and Vsn2 of the first and second systems are canceled by each other. Consequently, the total common-mode voltage Vsn (i.e., Vsn1+Vsn2) of the double-system motor control apparatus 10 becomes substantially zero. As a result, the time-average value of the total leakage current in the double-system motor control apparatus 10 is minimized, thereby minimizing EMI due to the common-mode voltages Vsn1 and Vsn2 of the first and second systems.

Figure 7:
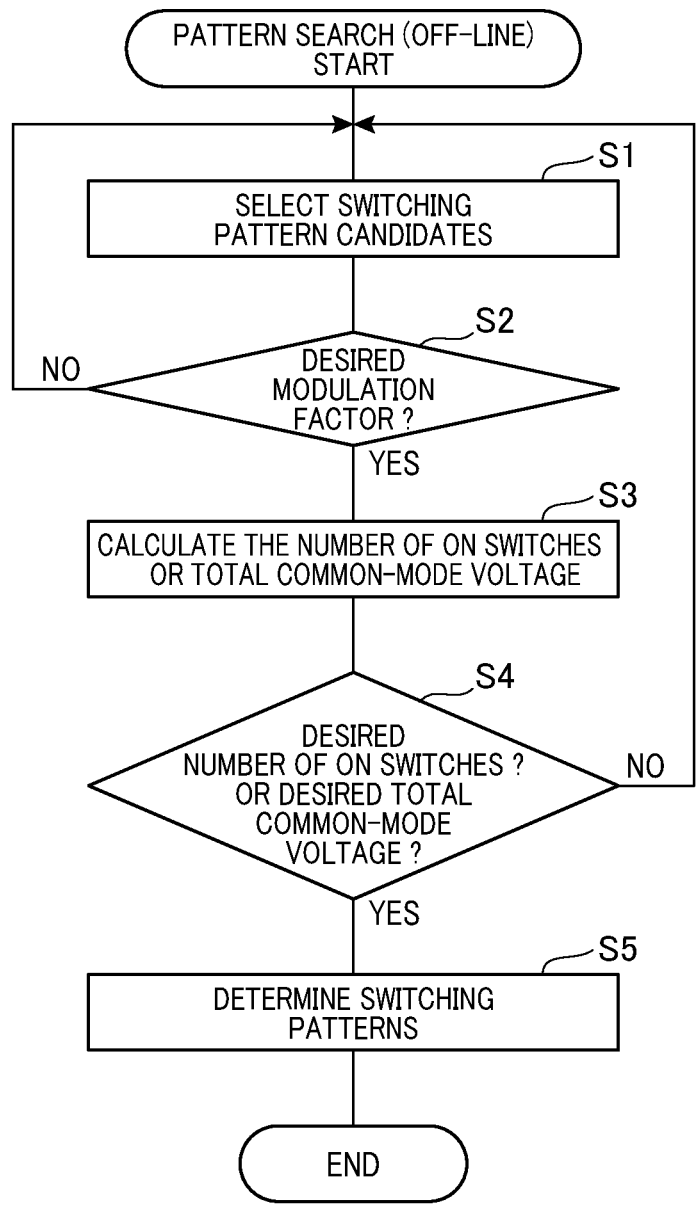
FIG. 7 is a flow chart illustrating a switching pattern search process performed by a controller of the double-system control apparatus according to the first embodiment.

Next, a switching pattern search process according to the present embodiment will be described with reference to FIG. 7.

In the present embodiment, the switching pattern search process is performed by the controller 30 in an off-line mode. Here, the off-line mode is defined as a mode in which the switching pattern search process is performed by the controller 30 separately from the control performed by the controller 30 for driving the motor 700. Consequently, the computing load of the controller 30 can be reduced.

Upon start of the process, in step S1, the controller 30 selects switching pattern candidates of the first and second systems.

In step S2, the controller 30 determines whether the modulation factor resulting from the switching pattern candidates selected in step S1 is equal to a desired modulation factor for producing the target output voltages of the first and second inverters 40 and 50.

If the determination in step S2 results in a NO answer, i.e., if the modulation factor resulting from the switching pattern candidates is not equal to the desired modulation factor, the process returns to step S1 to repeat steps S1 and S2.

In contrast, if the determination in step S2 results in a YES answer, i.e., if the modulation factor resulting from the switching pattern candidates is equal to the desired modulation factor, the process proceeds to step S3.

In step S3, the controller 30 calculates, based on the switching pattern candidates, the number of ON switches or the total common-mode voltage Vsn (i.e., the value of the evaluation function).

In step S4, the controller 30 determines whether the number of ON switches (or the total common-mode voltage Vsn) calculated in step S3 is equal to a desired number of ON switches (or a desired total common-mode voltage).

If the determination in step S4 results in a NO answer, i.e., if the number of ON switches (or the total common-mode voltage Vsn) calculated in step S3 is not equal to the desired number of ON switches (or the desired total common-mode voltage), the process returns to step S1 to repeat steps S1-S4.

In contrast, if the determination in step S4 results in a YES answer, i.e., if the number of ON switches (or the total common-mode voltage Vsn) calculated in step S3 is equal to the desired number of ON switches (or the desired total common-mode voltage), the process proceeds to step S5.

In step S5, the controller 30 determines the switching pattern candidates to be optimal switching patterns of the first and second systems. Then, the process terminates.

As described above, according to a first aspect of the present embodiment, the controller 30 determines, based on the evaluation function of the common-mode voltages Vsn1 and Vsn2 of the first and second systems (i.e. Equation (3)), the switching patterns of the first and second systems so as to minimize EMI due to the common-mode voltages Vsn1 and Vsn2.

More specifically, the controller 30 calculates, based on the evaluation function, the total common-mode voltage Vsn as the sum of the common-mode voltages Vsn1 and Vsn2 of the first and second systems. Moreover, the controller 30 determines the switching patterns of the first and second systems so as to minimize both the maximum value of the absolute value of the total common-mode voltage Vsn and the rate of change of the total common-mode voltage Vsn.

According to a second aspect of the present embodiment, the controller 30 determines the switching patterns of the first and second systems so as to keep the number of ON switches in the double-system motor control apparatus 10 constant at the optimal number Pe calculated by Equation (4).

According to a third aspect of the present embodiment, the controller 30 produces the switching patterns of the first and second systems by the PWM control that is performed by comparing, for each of the first and second systems, duty signals of the system which correspond to the target output voltage of the inverter of the system, with a carrier signal of the system. Moreover, the phases of the carrier signals of the first and second systems in the PWM control are offset from each other by 180°, so as to have the leakage currents induced by the common-mode voltages Vsn1 and Vsn2 of the first and second systems canceled by each other.

Consequently, according to the above three aspects of the present embodiment, it is possible to minimize EMI caused by the leakage currents induced by the common-mode voltages Vsn1 and Vsn2.

In addition, it is not necessary to always consider all of the above three aspects. Instead, it is possible to determine the switching patterns of the first and second systems focusing on only one of the above three aspects.

Second Embodiment

Compared to the double-system motor control apparatus 10 (see FIG. 1) according to the first embodiment, the triple-system motor control apparatus 10 (not shown) according to the second embodiment further includes an inverter of a third system having three phases of a, b and c. Moreover, compared to the motor 700 (see FIG. 1) controlled by the double-system motor control apparatus 10, the motor 700 (not shown) controlled by the triple-system motor control apparatus 10 further includes a third three-phase winding set comprised of a-phase, b-phase and c-phase windings.

Similar to the first and second inverters 40 and 50 (see FIG. 1), the third inverter (i.e., the inverter of the third system) has a-phase, b-phase and c-phase upper-arm switch elements and a-phase, b-phase and c-phase lower-arm switch elements bridge-connected. The third inverter converts, through the switching operation of the switch elements of the third system, DC power outputted from the battery 20 (see FIG. 1) into three-phase AC power and supplies the resultant three-phase AC power to the third winding set. The a-phase, b-phase and c-phase windings of the third winding set are Y-connected to define a neutral point m3 therebetween. The common-mode voltage Vsn3 of the third system is defined as the difference in electric potential between the neutral point b of the battery 20 and the neutral point m3 of the third winding set.

In the present embodiment, an evaluation function of the common-mode voltages Vsn1, Vsn2 and Vsn3 of the first, second and third systems can be expressed by the following Equation (5):

$$V_{sn} = V_{sn1} + V_{sn2} + V_{sn3} \quad (5)$$
$$= \frac{Vdc}{3}(S_u + S_v + S_w + S_x + S_y + S_z + S_a + S_b + S_c) - \frac{3}{2}Vdc$$

where Vdc is the DC voltage of the battery 20 and Su-Sw, Sx-Sz and Sa-Sc are respectively the switch functions of the u-w, x-z and a-c phases.

In the case of the number N of systems being an odd number, such as 3 in the present embodiment, there are no switching patterns that make the value of above Equation (5) equal to 0. In this case, there exist both a first optimal number Po1 of ON switches and a second optimal number Po2 of ON switches at which the maximum value of the absolute value of the total common-mode voltage Vsn in the N-tuple-system motor control apparatus 10 is minimum. The first optimal number Po1 of ON switches and the second optimal number Po2 of ON switches can be respectively calculated by the following Equations (6.1) and (6.2):

$$Po1 = 3 \times [(N-1)/2] + 1 \quad (6.1)$$

$$Po2 = 3 \times [(N+1)/2] - 1 \quad (6.2)$$

Accordingly, in the case of the triple-system motor control apparatus 10 according to the present embodiment, substituting N=3 into above Equations (6.1) and (6.2), it is obtained that Po1=4 and Po2=5. In addition, each of the first and second optimal numbers Po1 and Po2 also represents an optimal value of the term (Su+Sv+Sw+Sx+Sy+Sz+Sa+Sb+Sc) in Equation (5). When this term is equal to either of the first and second optimal numbers Po1 and Po2 (i.e., 4 and 5), the value of Equation (5) is equal to either of ±Vdc/6. That is, the absolute value of the value of Equation (5) is minimized.

Moreover, in the triple-system motor control apparatus 10 according to the present embodiment, by setting the phase difference Δθ between the carrier signals of the first, second and third systems in the PWM control to 120° or 240°, it is possible to cancel the common-mode voltages Vsn1, Vsn2 and Vsn3 of the first, second and third systems with each other. Here, each of 120° and 240° is a multiple of (360°/3).

Figure 8:
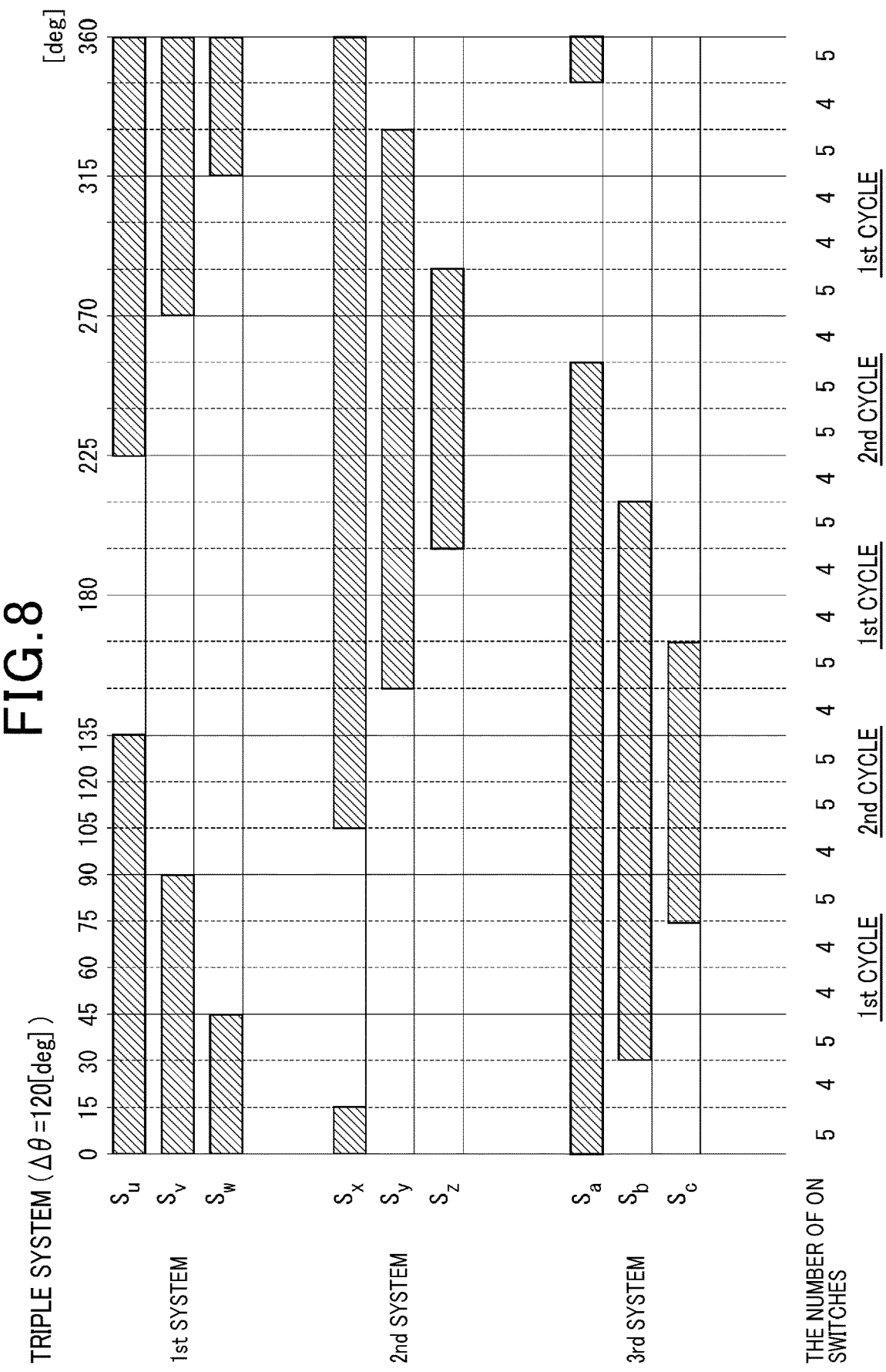
FIG. 8 is a schematic diagram illustrating an example of switching patterns of the first, second and third systems in a triple-system control apparatus according to a second embodiment.

FIG. 8 shows an example of switching patterns of the first, second and third systems in the triple-system control apparatus 10 according to the present embodiment. In this example, the phase difference Δθ between the carrier signals of the first, second and third systems in the PWM control is set to 120° so that both symmetry between the three systems and symmetry between the three phases of each system are ensured.

In the switching patterns shown in FIG. 8, as the number of ON switches, the first optimal number Po1 (i.e., 4) and the second optimal number Po2 (i.e., 5) are mixedly used in the unit of 15°. More specifically, first cycles of (5, 4, 4, 5) and second cycles of (4, 5, 5, 4) are alternately repeated.

With the switching patterns shown in FIG. 8, the rate of change of the total common-mode voltage Vsn cannot be reduced to 0, but can be kept at a minimum level corresponding to the difference (i.e., 1) between the first and second optimal numbers Po1 and Po2.

As above, in the triple-system motor control apparatus 10 according to the present embodiment, the switching patterns of the first, second and third systems are determined so as to minimize the maximum value of the absolute value of the total common-mode voltage Vsn and minimize the rate of change of the total common-mode voltage Vsn. Consequently, it is possible to achieve the same operational effects as achievable in the double-system motor control apparatus 10 according to the first embodiment.

In addition, it should be noted that without considering symmetry between the three systems and symmetry between the three phases of each system, the switching patterns of the three systems may alternatively be determined to keep the number of ON switches always constant at 4 or 5. It also should be noted that instead of the example shown in FIG. 8, other switching patterns may be employed in which the first optimal number Po1 (i.e., 4) and the second optimal number Po2 (i.e., 5) are mixedly used in a different manner from the example shown in FIG. 8.

Third Embodiment

Compared to the double-system motor control apparatus 10 (see FIG. 1) according to the first embodiment, the quadruple-system motor control apparatus 10 (not shown) according to the third embodiment further includes both an inverter of a third system having three phases of a, b and c and an inverter of a fourth system having three phases of d, e and f. Moreover, compared to the motor 700 (see FIG. 1) controlled by the double-system motor control apparatus 10, the motor 700 (not shown) controlled by the quadruple-system motor control apparatus 10 further includes both a third three-phase winding set comprised of a-phase, b-phase and c-phase windings and a fourth three-phase winding set comprised of d-phase, e-phase and f-phase windings.

Similar to the first and second inverters 40 and 50 (see FIG. 1), the third inverter (i.e., the inverter of the third system) has a-phase, b-phase and c-phase upper-arm switch elements and a-phase, b-phase and c-phase lower-arm switch elements bridge-connected. The third inverter converts, through the switching operation of the switch elements of the third system, DC power outputted from the battery 20 (see FIG. 1) into three-phase AC power and supplies the resultant three-phase AC power to the third winding set. The a-phase, b-phase and c-phase windings of the third winding set are Y-connected to define a neutral point m3 therebetween. The common-mode voltage Vsn3 of the third system is defined as the difference in electric potential between the neutral point b of the battery 20 and the neutral point m3 of the third winding set. On the other hand, the fourth inverter (i.e., the inverter of the fourth system) has d-phase, e-phase and f-phase upper-arm switch elements and d-phase, e-phase and f-phase lower-arm switch elements bridge-connected. The fourth inverter converts, through the switching operation of the switch elements of the fourth system, DC power outputted from the battery 20 (see FIG. 1) into three-phase AC power and supplies the resultant three-phase AC power to the fourth winding set. The d-phase, e-phase and f-phase windings of the fourth winding set are Y-connected to define a neutral point m4 therebetween. The common-mode voltage Vsn4 of the fourth system is defined as the difference in electric potential between the neutral point b of the battery 20 and the neutral point m4 of the fourth winding set.

In the present embodiment, an evaluation function of the common-mode voltages Vsn1, Vsn2, Vsn3 and Vsn4 of the first, second, third and fourth systems can be expressed by the following Equation (7):

$$\sum V_{sn} = \frac{Vdc}{3}\left(\sum S_{12}\right) - \frac{4}{2}Vdc \qquad (7)$$

In above Equation (7), the term ($\Sigma S_{12}$) represents the number of ON switches among all the switch elements of the twelve phases (i.e., the phases of u-w, x-z, a-c and d-f).

As described previously in the first embodiment, when N is an even number, the optimal number Pe of ON switches in the N-tuple-system motor control apparatus 10 can be calculated by Equation (4). Accordingly, in the case of the quadruple-system motor control apparatus 10 according to the present embodiment, substituting N=4 into Equation (4), it is obtained that Pe=6.

Generalizing above Equations (1), (3), (5) and (7), an evaluation function of the common-mode voltage(s) in an N-tuple-system motor control apparatus 10, where N is an integer greater than or equal to 1, can be expressed by the following Equation (8):

$$\sum V_{sn} = \frac{Vdc}{3}\left(\sum S_{3N}\right) - \frac{N}{2}Vdc \qquad (8)$$

In above Equation (8), the term ($\Sigma S_{3N}$) represents the number of ON switches among all the switch elements of the (3N) phases.

Moreover, in an N-tuple-system motor control apparatus 10, where N is an integer greater than or equal to 2, by setting the phase difference $\Delta\theta$ between the carrier signals of the N systems in the PWM control to a multiple of (360°/3), it is possible to cancel the common-mode voltages of the N systems with each other.

That is, to cancel the common-mode voltages of the N systems with each other, it is preferable to set the phase difference $\Delta\theta$ between the carrier signals of the N systems in the PWM control by the following Equation (9):

$$\Delta\theta = 360° \times k/N \qquad (9)$$

where k is an integer greater than or equal to 1 and less than or equal to (N−1).

Accordingly, in the case of the quadruple-system motor control apparatus 10 according to the present embodiment, substituting N=4 into above Equation (9), it is obtained that $\Delta\theta$=k×90°, where k is any one of 1, 2 and 3. That is, by setting the phase difference $\Delta\theta$ between the carrier signals of the four systems in the PWM control to any one of 90°, 180° and 270°, it is possible to cancel the common-mode voltages Vsn1-Vsn4 of the four systems with each other.

Figure 9:
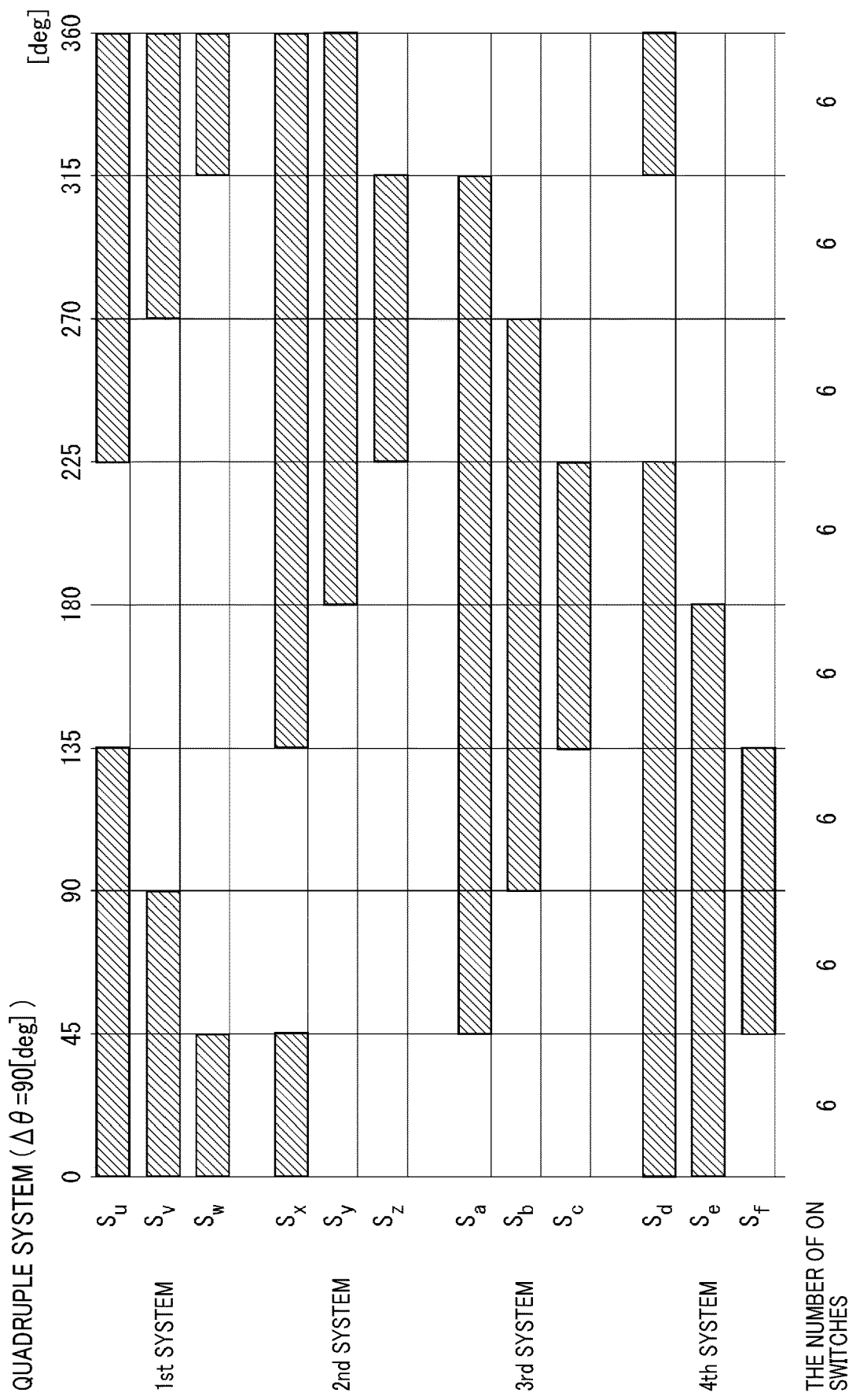
FIG. 9 is a schematic diagram illustrating an example of switching patterns of the first, second, third and fourth systems in a quadruple-system control apparatus according to a third embodiment.

FIG. 9 shows an example of the switching patterns of the first, second, third and fourth systems in the quadruple-system control apparatus 10 according to the present embodiment. In this example, the phase difference $\Delta\theta$ between the carrier signals of the four systems in the PWM control is set to 90°.

Figure 10:
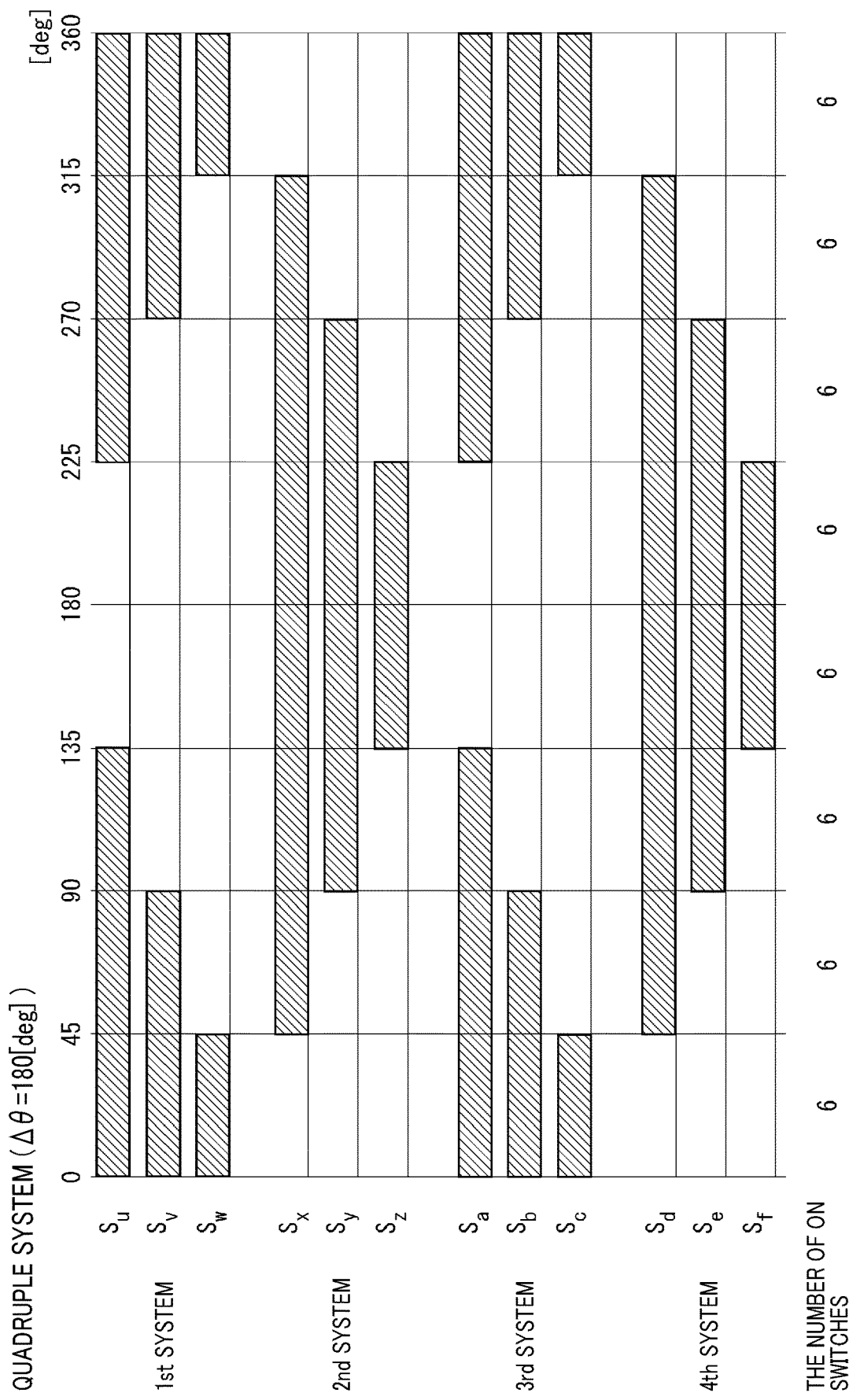
FIG. 10 is a schematic diagram illustrating another example of switching patterns of the first, second, third and fourth systems in the quadruple-system control apparatus according to the third embodiment.

FIG. 10 shows another example of the switching patterns of the first, second, third and fourth systems in the quadruple-system control apparatus 10 according to the present embodiment. In this example, the phase difference $\Delta\theta$ between the carrier signals of the four systems in the PWM control is set to 180°.

In the quadruple-system control apparatus 10 according to the present embodiment, with the switching patterns shown in FIG. 9 or FIG. 10, it is possible to achieve the same operational effects as achievable in the double-system motor control apparatus 10 according to the first embodiment.

While the above particular embodiments have been shown and described, it will be understood by those skilled in the art that various modifications, changes, and improvements may be made without departing from the spirit of the present disclosure.

For example, in the above-described embodiments, to minimize both the maximum value of the absolute value of the total common-mode voltage Vsn and the rate of change of the total common-mode voltage Vsn, the evaluation functions of the total common-mode voltage VSn (i.e., Equations (3), (5) and (7)) for determining the optimal switching patterns are set to include the number of ON switches as a variable. However, the evaluation functions may alternatively be set, in consideration of the operating state of the motors 700 and interference between the systems, to include various parameters as variables. In addition, the more complicated the evaluation functions, the more significant the effect of searing the optimal switching patterns in the off-line mode.

In the above-described embodiments, the control apparatuses are designed to control the multiple-winding rotating electric machines each of which is configured as an ISG. However, control apparatuses according to the present disclosure can also be applied to other multiple-winding rotating electric machines, more particularly to those where it is desired to reduce EMI.

In the above-described embodiments, the number of phases of each system in the multiple-system control apparatuses is equal to 3. However, the number of phases of each system may be modified to be four or more. In this case, the coefficients "3" and "⅓" in the above-described equations are changed according to the modified number of phases of each system.

What is claimed is:

1. A control apparatus for a multiple-winding rotating electric machine that includes a plurality of winding sets, the control apparatus comprising:

a plurality of inverters respectively corresponding to the winding sets of the multiple-winding rotating electric machine, each of the inverters including a plurality of switch elements and being configured to convert, through switching operation of the switch elements, DC power outputted from a DC power source into multi-phase AC power and supply the resultant multi-phase AC power to the corresponding winding set; and a controller configured to calculate target output voltages of the inverters and determine switching patterns of a plurality of systems according to the calculated target output voltages, each of the systems being constituted of a group of components provided for energization of a corresponding one of the winding sets of the multiple-winding rotating electric machine, the group of components including the one of the inverters which supplies the multi-phase AC power to the corresponding winding set, wherein the controller is configured to:

offset switching timings of the switch elements of each of the inverters from switching timings of the switch elements of any other of the inverters; and determine the switching patterns of the systems, based on an evaluation function of common-mode voltages of the systems, so as to minimize electro-magnetic interference due to the common-mode voltages, in each of the systems, the common-mode voltage of the system being defined as a difference in electric potential between a neutral point in voltage of the DC power source and a neutral point of the winding set corresponding to the system.

2. The control apparatus as set forth in claim 1, wherein the controller is configured to:
calculate, based on the evaluation function, a total common-mode voltage as a sum of the common-mode voltages of the systems; and
determine the switching patterns of the systems so as to minimize a maximum value of an absolute value of the total common-mode voltage.

3. The control apparatus as set forth in claim 1, wherein the controller is configured to:
calculate, based on the evaluation function, a total common-mode voltage as a sum of the common-mode voltages of the systems; and
determine the switching patterns of the systems so as to minimize a rate of change of the total common-mode voltage.

4. The control apparatus as set forth in claim 1, wherein the controller is configured to search the switching patterns of the systems in an off-line mode.

* * * * *